United States Patent

Yoon

(10) Patent No.: US 11,770,249 B2
(45) Date of Patent: Sep. 26, 2023

(54) APPARATUS AND METHOD FOR DETERMINING ENCODED PARAMETER VALUE IN WIRELESS COMMUNICATION SYSTEM

(71) Applicant: Samsung Electronics Co., Ltd., Suwon-si (KR)

(72) Inventor: Taiho Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 486 days.

(21) Appl. No.: 16/487,284

(22) PCT Filed: Feb. 21, 2018

(86) PCT No.: PCT/KR2018/002132
§ 371 (c)(1),
(2) Date: Aug. 20, 2019

(87) PCT Pub. No.: WO2018/155903
PCT Pub. Date: Aug. 30, 2018

(65) Prior Publication Data
US 2020/0022021 A1    Jan. 16, 2020

(30) Foreign Application Priority Data
Feb. 21, 2017  (KR) ........................ 10-2017-0022995

(51) Int. Cl.
*H04L 9/12* (2006.01)
*H04W 28/04* (2009.01)
(Continued)

(52) U.S. Cl.
CPC ............... *H04L 9/12* (2013.01); *H04W 12/03* (2021.01); *H04W 12/0433* (2021.01);
(Continued)

(58) Field of Classification Search
None
See application file for complete search history.

(56) References Cited

U.S. PATENT DOCUMENTS

2004/0039830 A1* 2/2004 Zhang ..................... H04L 69/22
709/230
2005/0090273 A1* 4/2005 Jin ....................... H04L 12/1877
455/502

(Continued)

FOREIGN PATENT DOCUMENTS

EP  2642788 A1 * 9/2013 ......... H04L 49/3009
EP  2 785 091 A1  10/2014
(Continued)

*Primary Examiner* — Ajit Patel
*Assistant Examiner* — Rodrick Mak
(74) *Attorney, Agent, or Firm* — Jefferson IP Law, LLP

(57) ABSTRACT

The present disclosure generally aims to prevent failure of decoding data in a wireless communication system. A method for operating a receiving end comprises the steps of: receiving a packet from a transmitting end; decoding the received packet using encoded parameters; detecting failure to release compression of a header in the decoded packet; and adjusting the value of the encoded parameters according to the detection of failure to release compression.

18 Claims, 7 Drawing Sheets

(51) Int. Cl.
    *H04W 28/06*     (2009.01)
    *H04W 12/03*     (2021.01)
    *H04W 12/0433*     (2021.01)
    *H04W 24/04*     (2009.01)
    *H04W 56/00*     (2009.01)

(52) U.S. Cl.
    CPC ........... *H04W 24/04* (2013.01); *H04W 28/04* (2013.01); *H04W 28/06* (2013.01); *H04W 56/001* (2013.01); *H04L 2209/30* (2013.01); *H04L 2209/80* (2013.01)

(56) References Cited

U.S. PATENT DOCUMENTS

| | | | | |
|---|---|---|---|---|
| 2010/0332933 A1* | 12/2010 | Kubota | ............... | H04W 12/037 714/E11.023 |
| 2013/0083702 A1* | 4/2013 | Barany | ................ | H04W 28/06 370/329 |
| 2014/0098797 A1 | 4/2014 | Kanamarlapudi et al. | | |
| 2014/0204920 A1 | 7/2014 | Sharma et al. | | |
| 2014/0287726 A1 | 9/2014 | Jang et al. | | |
| 2015/0280905 A1 | 10/2015 | Shah et al. | | |
| 2015/0382395 A1 | 12/2015 | Yang et al. | | |
| 2016/0088460 A1* | 3/2016 | Kim | ........................ | H04L 69/22 370/352 |
| 2016/0142936 A1 | 5/2016 | Bressanelli et al. | | |
| 2016/0241685 A1* | 8/2016 | Shah | ....................... | H04L 69/40 |
| 2017/0006496 A1 | 1/2017 | Jung et al. | | |
| 2018/0007113 A1* | 1/2018 | Parron | .................. | H04L 65/608 |
| 2019/0124550 A1* | 4/2019 | Hori | ........................ | H04W 8/24 |

FOREIGN PATENT DOCUMENTS

| | | | | |
|---|---|---|---|---|
| EP | 2785091 A1 * | 10/2014 | ............ | H04W 12/10 |
| KR | 10-2017-0004598 A | 1/2017 | | |
| WO | WO-2012079381 A1 * | 6/2012 | ......... | H04L 49/3009 |

* cited by examiner

APPARATUS AND METHOD FOR DETERMINING ENCODED PARAMETER VALUE IN WIRELESS COMMUNICATION SYSTEM

TECHNICAL FIELD

The disclosure generally relates to a wireless communication system, and more particularly, to an apparatus and a method for preventing failure in deciphering data in a wireless communication system.

BACKGROUND ART

In the past mobile communication systems, telephone services were provided through public switched telephone networks (PSTNs). However, thanks to the recent development of communication technology, broadband mobile data communication services become possible, and accordingly, data communication-based internet telephone services, that is, voice over internet protocol (VoIP) services, are provided. Therefore, users may use VoIP communication through an access network providing internet protocol (IP) connectivity.

A long term evolution (LTE) system, which is a current 4th generation mobile communication system, also supports the VoIP service. The VoIP service provided through the LTE system may be referred to as "voice over LTE (VoLTE)." Voice communication through VoLTE uses robust header compression (RoHC), which is technology for compressing a header of an IP, a user datagram protocol (UDP), a real-time transport protocol (RTP), in order to save wireless resources. A terminal and a base station may transmit a packet having a header compressed to each other, and restore the received packet by decompressing, such that an amount of data passing through a wireless section can be greatly reduced.

DISCLOSURE OF INVENTION

Technical Problem

Based on the above-described discussion, the disclosure provides an apparatus and a method for determining an enciphering parameter of data in a wireless communication system.

In addition, the disclosure provides an apparatus and a method for preventing failure in deciphering received data in a wireless communication system.

In addition, the disclosure provides an apparatus and a method for adjusting an enciphering parameter to prevent failure in deciphering received data in a wireless communication system.

In addition, the disclosure provides an apparatus and a method for preventing de-synchronization of an enciphering parameter when a data loss occurs due to a wireless environment in a wireless communication system.

In addition, the disclosure provides an apparatus and a method for preventing a voice call drop caused by de-synchronization of a hyper frame number (HFN) which is one of deciphering key values in a wireless communication system.

Solution to Problem

According to various embodiments of the disclosure, an operating method of a reception end in a wireless communication system includes: receiving a packet from a transmission end; deciphering the received packet by using an enciphering parameter; detecting a failure in decompression of a header of the deciphered packet; and adjusting a value of the enciphering parameter in response to the failure in decompression being detected.

According to various embodiments of the disclosure, a reception end apparatus in a wireless communication system includes: a transceiver configured to receive a packet from a transmission end; and a controller configured to decipher the received packet by using an enciphering parameter, to detect a failure in decompression of a header of the deciphered packet, and to adjust a value of the enciphering parameter in response to the failure in decompression being detected.

Advantageous Effects of Invention

The apparatus and the method according to various embodiments of the disclosure can prevent failure in deciphering by detecting de-synchronization of an enciphering parameter when a packet loss occurs due to a wireless environment, and automatically adjusting the enciphering parameter. By doing so, a 1-way phenomenon of a voice call can be prevented, and a voice call drop can be prevented.

The effects that can be achieved by the disclosure are not limited to those mentioned in the above, and other effects that are not mentioned herein could be clearly understood by a person skilled in the art based on the following descriptions.

BEST MODE FOR CARRYING OUT THE INVENTION

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if terms are terms which are defined in the disclosure, they should not be interpreted as excluding embodiments of the disclosure.

In various embodiments of the disclosure described below, hardware-wise approach methods will be described by way of an example. However, various embodiments of the disclosure include technology using both hardware and software, and thus do not exclude software-based approach methods.

The disclosure relates to an apparatus and a method for determining an enciphering parameter of data in a wireless communication system. Specifically, the disclosure describes technology for preventing de-synchronization of an enciphering parameter when a packet loss occurs due to a wireless environment in a wireless communication system.

As used herein, terms indicating network entities, terms indicating control information (for example, HFN, PDCP SN, etc.), terms indicating elements of an apparatus, terms indicating communication technology are examples for convenience of explanation. Accordingly, the disclosure is not limited to the terms described below, and other terms having the same technical meanings may be used.

In addition, the disclosure describes various embodiments using a long term evolution (LTE) system and an LTE-advanced (LTE-A) system, but this is merely an example for convenience of explanation. Various embodiments of the disclosure may be easily changed and applied to other communication systems, for example.

Figure 1:
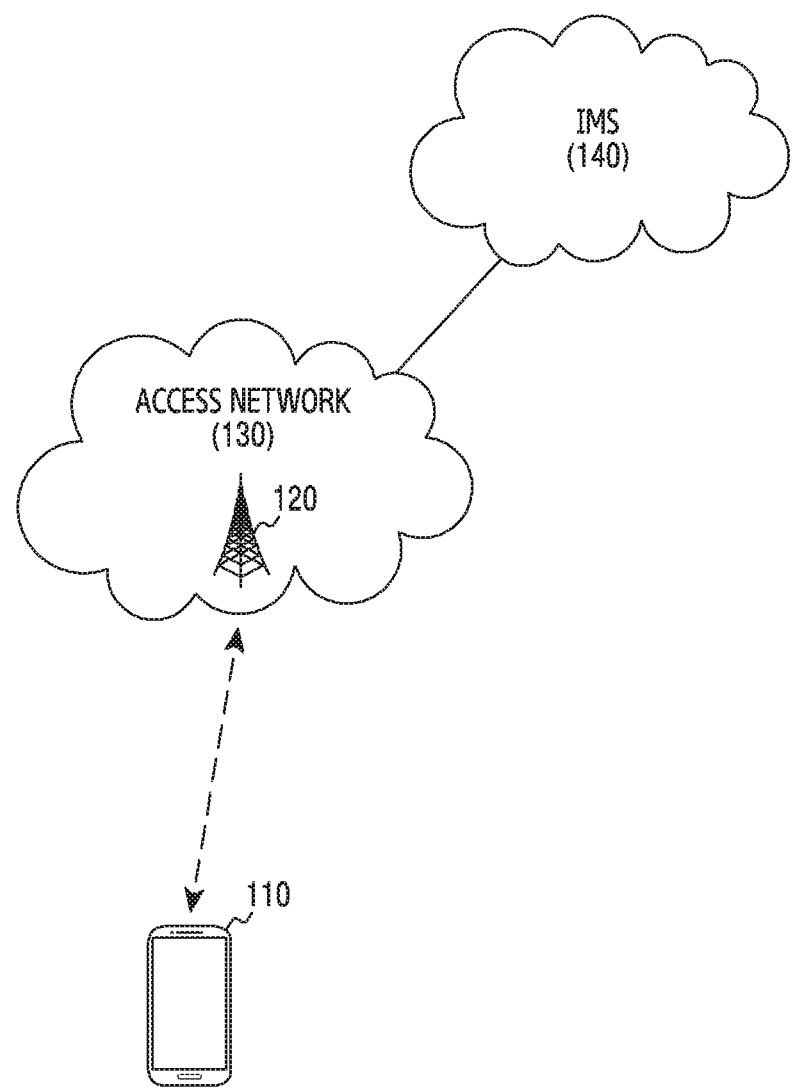
FIG. 1 is a view illustrating a wireless communication system according to various embodiments of the disclosure.

FIG. 1 illustrates a wireless communication system according to various embodiments of the disclosure. Referring to FIG. 1, the system includes a terminal 110, an access network 130 including a base station 120, and an IP multimedia subsystem (IMS) 140.

The terminal 110 is a user device and performs communication with the base station 120 through a wireless channel. The terminal 110 provides a voice over internet protocol (VoIP) function, and executes an application for a VoIP service according to a user's command. Accordingly, the terminal 110 may transmit and receive a voice packet for the VoIP to and from the base station 120. In various embodiments, the terminal 110 may be a portable electronic device, and may be one of a smart phone, a portable terminal, a mobile phone, a mobile pad, a media player, a tablet computer, a handheld computer, or a personal digital assistant (PDA). In other embodiments, the terminal 110 may be a stationary device. In addition, the terminal 110 may be a device combining functions of two or more of the above-described devices.

The base station 120 provides wireless access to the terminal 110. The base station 120 is one of the entities constituting the access network 130, and has a coverage including a predetermined geographic range. The base station 120 may be referred to as an "access point (AP)," an "evolved nodeB (eNB)," a "5th generation node (5G node)," a "wireless point," a "transmission/reception point (TRP)," or other terms having the same technical meaning as the above-mentioned terms, in addition to the term "base station."

The terminal 110 and the base station 120 may be a transmission end or a reception end, respectively, in various embodiments which will be described below. That is, when the terminal 110 receives data from the base station 120, the terminal 110 is a reception end and the base station 120 is a transmission end. To the contrary, when the terminal 110 transmits data to the base station 120, the terminal 100 is a transmission end and the base station 120 is a reception end. Accordingly, in various embodiments of the disclosure, the transmission end may be the terminal 110 or the base station 120, and in this case, the reception end may be the base station 120 or the terminal 110.

The access network 130 is a system for connecting the terminal 110 to an external network (for example, an internet protocol (IP) network), and may include other entities such as a gateway, a mobility management entity (MME), etc. as well as the base station 120.

The IMS 140 is a subsystem managing sessions. The IMS 140 may be operated independently from the access network 130. The IMS 140 may provide multimedia services such as a voice, an audio, a video, data, etc. based on the IP. When the terminal 110 performs voice communication with the other device through the VoIP service, voice packets are transmitted and received through the IMS 140. According to an embodiment, when the terminal 110 receives voice over LTE (VoLTE) voice communication through an LTE network, voice packets are transmitted and received through the IMS 140. The IMS 140 may include a proxy-call session control function (P-CSCF), a serving-call session control function (S-CSCF), an interrogating-call session control function (I-CSCF), a PCRF, a home subscriber server (HSS), etc.

Figure 2:
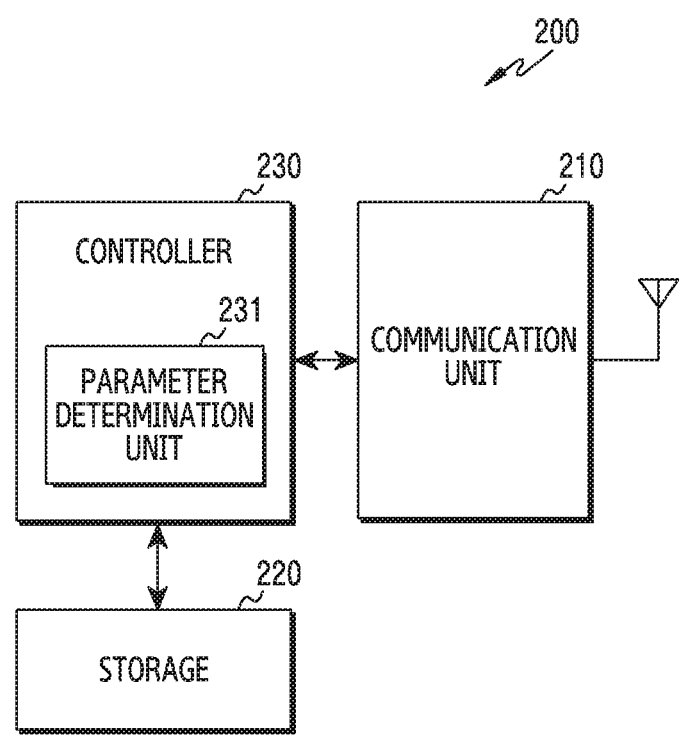
FIG. 2 is a view illustrating a block configuration of a reception end in a wireless communication system according to various embodiments of the disclosure.

FIG. 2 illustrates a block configuration of a reception end 200 in a wireless communication system according to various embodiments of the disclosure. The configuration of FIG. 2 may be understood as a configuration of the terminal 110 or the base station 120. The term "unit" or terms ending with suffixes "-er" and "-or" used in the following description refer to a unit which processes at least one function or operation, and may be implemented by hardware, software, or a combination of hardware and software. As shown in FIG. 2, the reception end includes a communication unit 210, a storage 220, and a controller 230.

The communication unit 210 performs functions for transmitting and receiving signals through a wireless channel. For example, the communication unit 210 performs a function of converting between a baseband signal and a bit string according to a physical layer standard of the system. For example, when transmitting data, the communication unit 210 may generate complex symbols by encoding and modulating a transmission bit string. In addition, when receiving data, the communication unit 210 may restore a reception bit string by demodulating and decoding a baseband signal. In addition, the communication unit 210 may up-convert a baseband signal into a radio frequency (RF) band signal, and then may transmit the signal via an antenna, and may down-convert an RF band signal received via an antenna into a baseband signal.

To achieve this, the communication unit 210 may include a transmission filter, a reception filter, an amplifier, a mixer, an oscillator, a digital-to-analogue converter (DAC), an analogue-to-digital converter (ADC), etc. In addition, the communication unit 210 may include a plurality of transmission and reception paths. Furthermore, the communication unit 210 may include at least one antenna array including a plurality of antenna elements. In the hardware aspect, the communication unit 210 may include a digital unit and an analog unit, and the analog unit may include a plurality of sub-units according to operating power, operating frequency, etc.

The communication unit 210 may transmit and receive signals as described above. Accordingly, the communication unit 210 may be referred to as a "transmitter," "receiver," or "transceiver." In addition, in the following description, transmitting and receiving via a wireless channel may include processing by the communication unit 210 as described above.

The storage 220 may store data such as a basic program for the operation of the reception end, an application program, setting information, etc. The storage 220 may include a volatile memory, a nonvolatile memory, or a combination of a volatile memory and a nonvolatile memory. In addition, the storage 220 may provide stored data according to a request of the controller 230.

The controller 230 controls overall operations of the reception end. For example, the controller 230 may transmit and receive signals via the communication unit 210. In addition, the controller 230 may record or read out data on or from the storage 220. To achieve this, the controller 230 may include at least one processor or micro processor, or may be a portion of a processor. In addition, a portion of the communication unit 210 and the controller 230 may be referred to as a communication processor (CP). In particular, the controller 230 determines an enciphering parameter according to failure in decompression at the reception end 200 according to various embodiments, which will be described below. To achieve this, the controller 230 may include a parameter determination unit 231. Herein, the parameter determination unit 231 may be an instruction set or code stored in the storage 220, as an instruction/code at least temporarily resided in the controller 230, or a storage space that stores the instruction/code, or may be a portion of a circuitry constituting the controller 230. For example, the controller 230 controls the reception end to perform a procedure according to various embodiments which will be described below.

According to various embodiments of the disclosure, voice communication using a VoIP service may be performed between the terminal 110 and the base station 120. According to an embodiment, in the case of VoLTE which is a voice communication service of an LTE system, a robust header compression (RoHC) compression technique for compressing a header of an IP, a user datagram protocol (UDP), a real time protocol (RTP) according to each profile is used to save wireless resources. Since operations of the RoHC compression technique are performed in a packet data convergence protocol (PDCP) stack of LTE, and all of the data of a wireless section is enciphered, a decompressing operation may be performed after a deciphering operation of the PDCP is performed.

According to an embodiment, the reception end out of the terminal 110 or the base station 120 that receives a VoLTE voice packet may receive data which is compressed through the RoHC technique and then is enciphered. The reception end may decipher the received packet and then decompress the deciphered packet through the RoHC compression technique. In this case, there may be an uplink or downlink loss due to a wireless radio frequency (RF) environment problem. According to an embodiment, when a loss of 128 RTPs occurs (for example, about 2 seconds) with reference to a 7-bit PDCP sequence number (SN), de-synchronization of a hyper frame number (HFN), which is used as one of the key values for deciphering between the terminal and the base station, occurs. According to the LTE standard, a COUNT value which is used to decipher a received voice packet may be configured by a combination of an HFN and a PDCP SN. In the case of a downlink, the PDCP SN may be transmitted from the base station 120 to the terminal 110, and may increase by 1 every protocol data unit (PDU). The HFN is calculated at the base station 120 and the terminal 110, respectively. Specifically, when the PDCP SN reaches a maximum value, the next PDCP SN is 0 and the HFN increases by 1. In this case, when de-synchronization occurs in the HFN, de-synchronization occurs in the COUNT value, and accordingly, a 1-way phenomenon may occur at the reception end 200 due to failure in deciphering. This may result in a call drop.

According to the present LTE standard, an HFN re-sync function, referred to as a count check, is defined. However, since signaling for additional radio resource control (RRC) setting may be required and an additional delay may occur, the HFN re-sync function may not be appropriate for a real-time-based VoLTE environment.

The disclosure is not limited to the VoIP service environment or the LTE environment. According to other embodiments, a method for synchronizing an enciphering parameter, suggested in the disclosure, may be applied to all systems in which a transmission end enciphers a packet and then compresses the packet according to the RoHC compression technique, and transmits the packet, and a reception end deciphers the received packet and then decompresses the packet according to the RoHC compression technique.

Figure 3A:
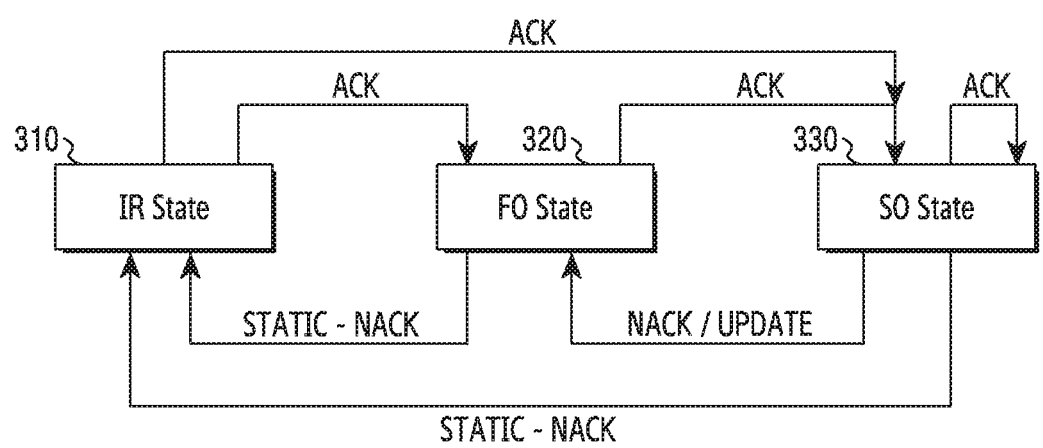
FIG. 3A is a view illustrating a process of controlling a state of a compressor when a robust header compression (RoHC) method is used in a wireless communication system according to various embodiments of the disclosure.
Figure 3B:
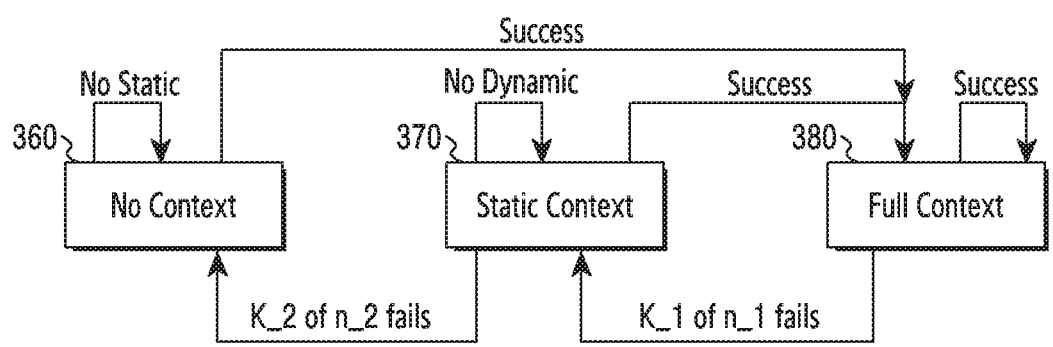
FIG. 3B is a view illustrating a process of controlling a state of a decompressor when the RoHC method is used in the wireless communication system according to various embodiments of the disclosure.

According to an embodiment of the disclosure, an RoHC algorithm used for compressing and decompressing a packet may be performed as will be described below. FIGS. 3A and 3B illustrate processes of controlling a compression state when the RoHC method is used in a wireless communication system according to an embodiment.

FIG. 3A illustrates a process of controlling a state of a compressor when the RoHC method is used in the wireless communication system according to various embodiments of the disclosure.

Referring to FIG. 3A, according an embodiment, the compressor compresses a header of an enciphered packet by the RoHC technique. The RoHC technique is similar to a video compression technique. That is, when there is a base frame, a frame displaying a difference from the base frame is transmitted thereafter. Accordingly, even when a lost packet rate is high, a high compression rate can be maintained as long as the base frame is not lost. The compressor may be placed in any one of an initialization & refresh (IR) state 310, a first-order (FO) state 320, and a second order (SO) state 330. The IR state 310 refers to a state in which the compressor is just generated or reset, and in this state, a whole packer header is transmitted. The compressor always starts in the IR state 310, and in this state, the compressor transmits the whole packet header that is not compressed, such that a decompressor can establish a complete context. In the FO state 320, the compressor recognizes and stores a static field such as an IP address, a port number, and transmits a dynamic packet field difference. That is, the FO state 320 refers to a state in which the static field is compressed and the dynamic field is partially compressed. In the SO state 330, the compressor compresses all of the dynamic fields such as an RTP sequence number, and transmits only a logical sequence number and a partial checksum for verifying the next packet. In general, in the FO state 320, all of the static fields and most of the dynamic fields are compressed, and in the SO state 330, all of the dynamic fields are compressed periodically by using the sequence number and the checksum.

When the compressor is in an O-mode (bidirectional optimistic mode), the compressor and the decompressor may maintain context synchronization through a feedback channel. Referring to FIG. 3A, when feedback of acknowledgement (ACK) is received in the IR state 310, the compressor is changed to the FO state 320 or SO state 330. When feedback of ACK is received in the FO state 320, the compressor is changed to the SO state 330. When feedback of ACK is received in the SO state 330, the compressor is continuously maintained in the SO state 330 in which all of the static fields and dynamic fields are compressed. On the other hand, when feedback of negative acknowledgement (NACK) is received in the SO state 330, the compressor is shifted to the FO state 330 and compresses the static fields and a part of the dynamic fields. When feedback of STATIC-NACK is received in the SO state 330, the compressor is shifted to the IR state 310 and transmits a whole packet header that is not compressed. In addition, when feedback of STATIC-NACK is received in the FO state 320, the compressor is shifted to the IR state 310 and transmits the whole packet header that is not compressed. When the compressor is shifted to the IR state 310, the compressor is maintained in the IR state 310 until ACK is received again.

FIG. 3B illustrates a process of controlling a state of the decompressor when the RoHC method is used in the wireless communication system according to various embodiments of the disclosure.

Referring to FIG. 3B, the decompressor receives a compressed packet. The decompressor is placed in any one of the three states. The decompressor starts decompressing in a state (no context) 360 in which no context information exists at a start point of a packet flow. When the decompressor receives an IR packet and obtains whole packet header information, the decompressor may be changed to a state (static context) 370 in which a difference of some dynamic packet fields and the static field such as an IP address, a port number are received. Alternatively, the decompressor is placed in a state in which difference information of the static field is also obtained, that is, a state (full context) 380 in which difference information of the dynamic field such as an RTP sequence number is received. In this case, when decompression continuously succeeds, the decompressor is maintained in the same state 380. On the other hand, when failure in decompression continuously occurs, the decompressor may transmit NACK and may be changed to the state 370. When there is a try at restoring data, but failure in decompression continuously occurs, the decompressor may transmit STATIC-NACK to the compressor and may be changed to the state 360. When the decompressor is shifted to the state 360, the decompressor receives a whole packet header that is not compressed.

Since all of the data of a wireless section transmitted and received between the terminal 110 and the base station 120 is enciphered as described above, a received packet is decompressed according to the RoHC compression technique after being deciphered. In the case of VoLTE according to an embodiment, failure in deciphering caused by enciphering parameter HFN de-synchronization may not be detected in the PDCP stack before the header is decompressed according to the RoHC compression technique. Therefore, in order to detect de-synchronization of the HFN and to determine a need to change the HFN value, decompression according to the RoHC algorithm should precede after deciphering is performed by using the HFN value.

Figure 4:
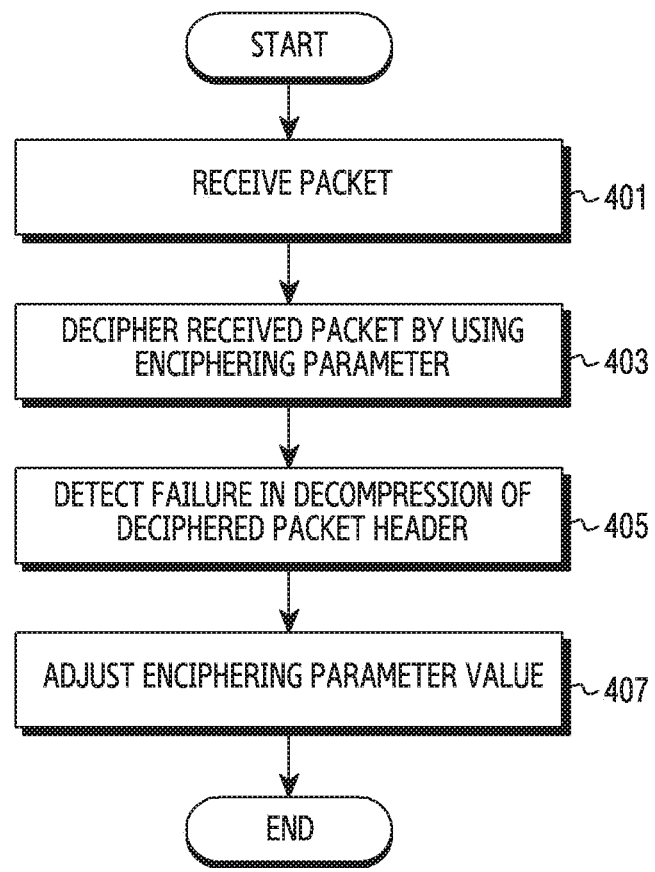
FIG. 4 is a view illustrating an operating method of a reception end in a wireless communication system according to various embodiments of the disclosure.
Figure 5:
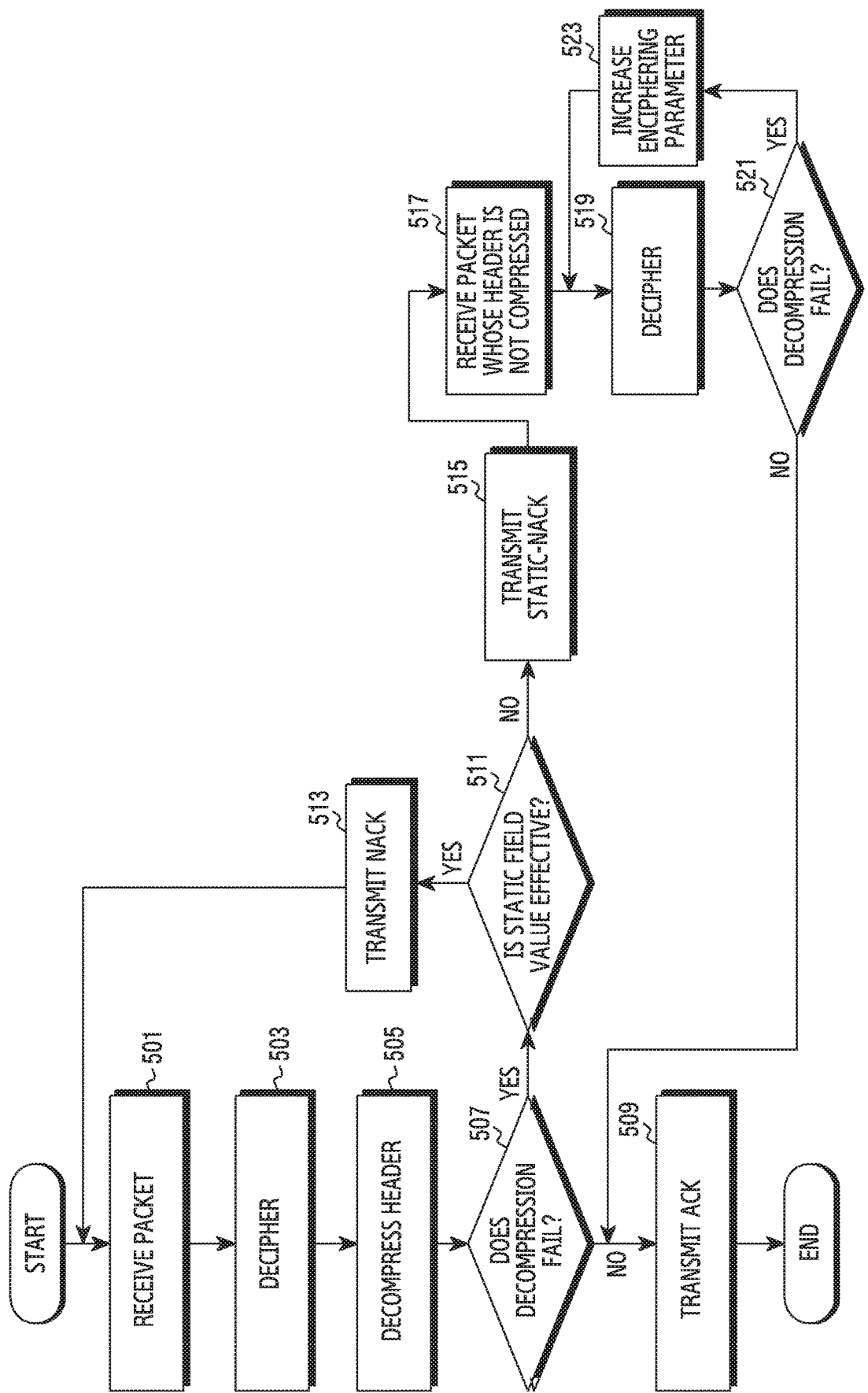
FIG. 5 is a view illustrating a method for operating of a reception end through RoHC decompression in a wireless communication system according to various embodiments of the disclosure.
Figure 6:
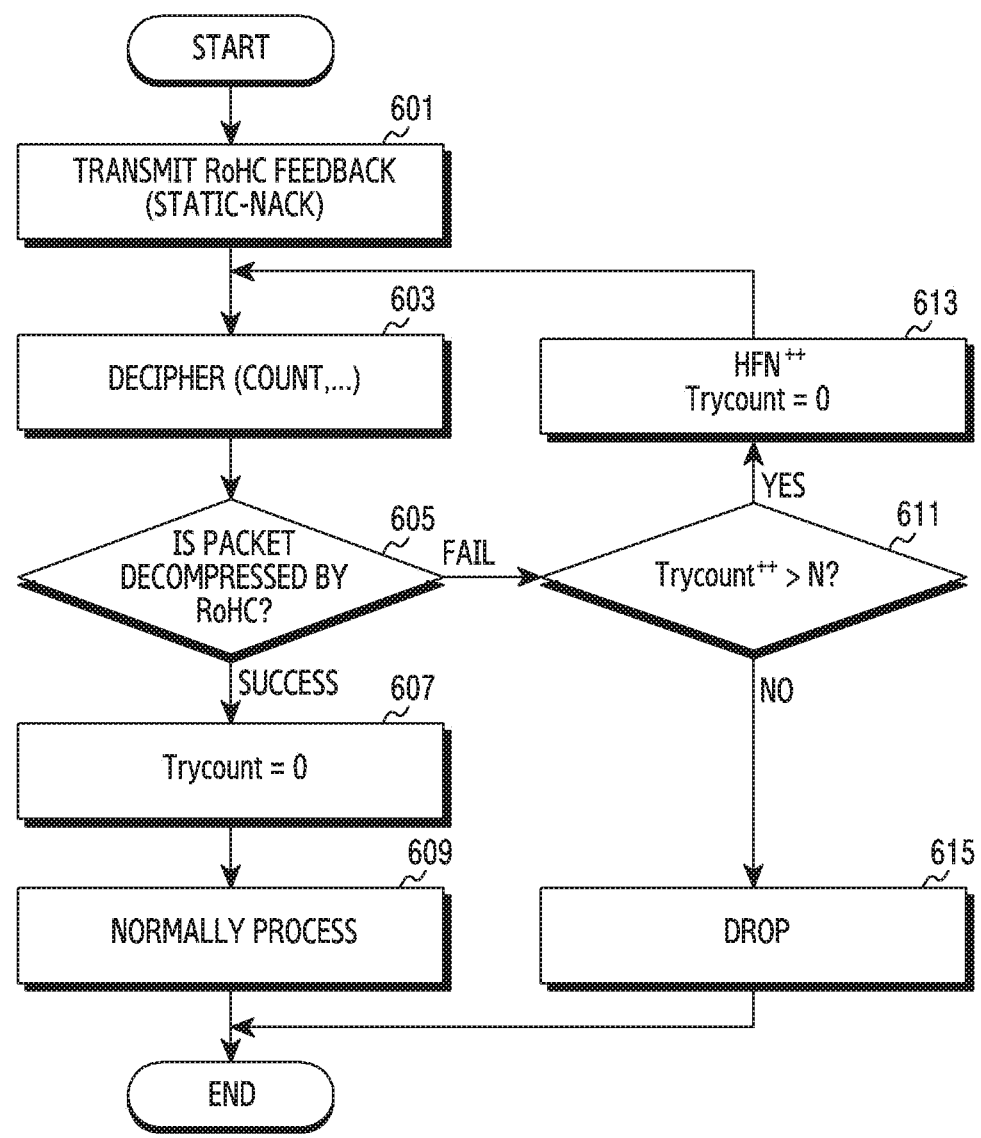
FIG. 6 is a view illustrating an operating method of a reception end after feedback is transmitted due to failure in decompression in a wireless communication system according to various embodiments of the disclosure.

According to various embodiments of the disclosure, a procedure of detecting de-synchronization of an enciphering parameter at a side receiving a packet, and changing the enciphering parameter value may be performed as shown in FIGS. 4 to 6.

FIG. 4 illustrates a method for operating of a reception end in a wireless communication system according to various embodiments of the disclosure. FIG. 4 illustrates an operating method of the reception end 200. The reception end 200 may be the terminal 110 or the base station 120.

Referring to FIG. 4, the reception end receives a packet in step 401. That is, the reception end receives a packet whose header is compressed after being enciphered from a transmission end. According to an embodiment, the transmission end enciphers a packet to be transmitted to the reception end by using an enciphering parameter. Thereafter, the transmission end compresses the enciphered packet according to the RoHC compression technique, and transmits the packet to the reception end, and the reception end receives the compressed packet from the transmission end. Herein, a value of the enciphering parameter may be statically or dynamically changed. For example, the value of the enciphering parameter may change according to the number of transmitted packets.

Thereafter, in step 403, the reception end deciphers the received packet by using the enciphering parameter. That is, the reception end may decipher the received packet, and in this case, when the enciphering parameter value related to a used key value is not synchronized, the reception end may not normally decipher the data transmitted from the transmission end. In other words, when the enciphering parameter value is not a normal value, the deciphered data may have a difference from the data included in the transmitted packet. According to an embodiment, the reception end deciphers by using the same enciphering parameter value as at the transmission end.

In step 405, the reception end detects failure in decompressing the header of the deciphered packet. That is, when the header portion of the deciphered packet is decompressed, but decompression is not normally performed, the reception end detects failure in decompression. According to an embodiment, the reception end decompresses the header of the deciphered packet through an RoHC algorithm, and detects failure in decompression. According to an embodiment, the reception end may determine whether decompression succeeds through a cyclical redundancy check (CRC) examination. When the failure in decompression is detected, the state of the decompressor is changed as shown in FIG. 3, and feedback of NACK or STATIC-NACK may be transmitted to the compressor.

In step 407, the reception end adjusts the enciphering parameter value. That is, the reception end may change the enciphering parameter value by comparing with a predefined reference, based on the detected failure in decompression of the packet header. According to an embodiment, the reception end may detect the failure in decompression of the header of the deciphered packet through the RoHC algorithm, and may feed NACK or STATIC-NACK back to the transmission end. When the reception end feeds STATIC-NACK, the transmission end transmits a packet whose header is not compressed. When the packet whose header is not compressed is received but decompression fails, the reception end may determine that the cause of the failure in decompression is failure in deciphering caused by an error in the enciphering parameter, and may adjust the enciphering parameter value. For example, the reception end may increase the enciphering parameter value.

FIG. 5 illustrates a method for operating of a reception end through RoHC decompression in a wireless communication system according to various embodiments. FIG. 5 illustrates an operating method of the reception end 200. The reception end 200 may be the terminal 110 or the base station 120.

Referring to FIG. 5, in step 501, the reception end receives a packet. That is, the reception end receives a packet whose header is compressed after being enciphered from a transmission end. In the case of VoLTE according to an embodiment, the reception end may receive a voice packet which is enciphered in a PCDP stack and has a header compressed by an RoHC algorithm from the transmission end.

Thereafter, in step 503, the reception end deciphers the received packet by using am enciphering parameter. That is, in the case of VoLTE according to an embodiment, the reception end receives the compressed voice packet and deciphers the packet by using an HFN value.

In step 505, the reception end decompresses the deciphered packet header. That is, in the case of VoLTE according to an embodiment, the reception end decompresses the header compressed according to the RoHC algorithm.

In step 507, the reception end determines whether decompression of the deciphered packet fails or not. That is, the reception end determines whether decompression of the header of the deciphered packet succeeds as a result of decompressing in step 505. According to an embodiment, the reception end may determine whether decompression succeeds through a CRC examination.

When decompression succeeds, the reception end transmits an ACK message in step 509. According to an embodiment, the reception end decompress the header of the packet through the RoHC algorithm, and, when decompression succeeds, feeds the ACK message back. As described above in FIG. 3A, the transmission end receiving feedback of the ACK message is maintained in the SO state 330 and also compresses dynamic data and transmits a packet.

When decompression fails, the reception end determines whether a static field is effective according to the failure in decompression. That is, the reception end determines whether a static field value such as an IP address, a port number is effective with respect to the decompressed header. According to an embodiment, when a packet loss occurs due to a problem of a wireless environment between the base station and the terminal, RoHC decompression continuously fails at the reception end. In this case, the reception end may determine that the static field value is effective and may determine a type of a message to be fed back to the transmission end.

When the static field value is effective, the reception end transmits an NACK message in step 513. That is, when the static field value is effective in step 511 and decompression fails due to de-synchronization of a dynamic field value, the reception end feeds the NACK message back to the transmission end in step 513. As described above in FIG. 3A, the transmission end receiving feedback of the NACK message is shifted to the FO state 320, and compresses the static field and a part of the dynamic field, and transmits a packet in which a dynamic field such as an RTP sequence is not compressed.

When the static field value is not effective, the reception end transmits a STATIC-NACK message in step 515. That is, when the dynamic field value is de-synchronous and the static field value is not effective in step 511, and thus decompression fails, the reception end feeds STATIC-NACK back to the transmission end in step 515. As described above with reference to FIG. 3A, the transmission end receiving feedback of the STATIC-NACK message is shifted to the IR state 310, and transmits a packet whose header is not compressed.

Thereafter, in step 517, the reception end receives the packet whose header is not compressed. According to an embodiment, the transmission end receiving the feedback of the STATIC-NACK is shifted to the IR state 310, such that a packet which is not compressed by RoHC is transmitted, and the reception end receives the packet which is not compressed by RoHC.

In step 519, the reception end deciphers the received packet. That is, in the case of VoLTE according to an embodiment, the reception end deciphers the received voice packet by using an HFN value which is an enciphering key value.

In step 521, the reception end determines whether decompression of the deciphered packet fails or not. That is, the reception end determines whether failure in decompression is detected with respect to the packet received after STATIC-NACK is transmitted. According to an embodiment, the reception end receives an IR packet from the transmission end after feeding STATIC-NACK back, and, since the IR packet does not have the header compressed, the IR packet includes whole header information. When the reception end does not normally obtain whole header information from the received packet, the reception end may determine that decompression fails. According to an embodiment, the reception end may determine whether decompression succeeds through a CRC examination. As described above, the reception end may determine failure in deciphering, that is, failure in deciphering due to HFN de-synchronization, by determining failure in decompression of the packet received after transmitting STATIC-NACK.

When decompression succeeds, the reception end resumes step 509. That is, when failure in RoHC decompression is not detected, the reception end feeds an ACK message back to the transmission end. As described above with reference to FIG. 3A, the transmission end receiving feedback of the ACK message is changed from the IR state 310 resulting from the reception of STATIC-NACK to the FO state 320 or the SO state 330, and transmits a packet whose header is compressed.

When decompression fails, the reception end increases the enciphering parameter in step 523. That is, when failure in RoHC decompression is detected, the reception end may adjust the enciphering parameter value. In the case of VoLTE according to an embodiment, when failure in RoHC decompression is detected, the reception end may determine that deciphering fails due to de-synchronization of the HFN which is an enciphering key, and may increase the HFN value. In this case, the HFN value may be increased by 1 at a time, or may be increased by 1 or more based on an experimental value.

FIG. 6 illustrates a method for operating of a reception end after transmitting feedback according to failure in decompression in a wireless communication system according to various embodiments of the disclosure. FIG. 6 illustrates an operating method of the reception end 200. The reception end 200 may be the terminal 110 or base station 120.

Referring to FIG. 6, in step 601, the reception end transmits STACK-NACK as RoHC feedback. That is, the reception end feeds STATIC-NACK back to the transmission end according to failure in RoHC decompression of a previously received packet. According to an embodiment, the processes before STATIC-NACK is transmitted may be performed as in steps 501 to 515 illustrated in FIG. 5. That is, the reception end deciphers the previously received packet by using an HFN which is an enciphering key value, and then decompresses the packet by RoHC, and, when failure in RoHC decompression is detected and a static field value is not effective, the reception end feeds STATIC-NACK back to the transmission end.

Next, in step 603, the reception end deciphers a received packet. That is, the reception end deciphers a packet which is received after STATIC-NACK is transmitted. In the case of VoLTE according to an embodiment, the reception end deciphers a PDCP packet by using a COUNT value configured by a combination of an HFN and a PDCP SN.

In step 605, the reception end determines whether RoHC decompression of the deciphered packet succeeds or not. That is, the reception end determines whether failure in RoHC decompression of the deciphered packet occurs. Referring to FIG. 3 according to an embodiment, when STATIC-NACK feedback is received at the transmission end, the transmission end transmits an IR packet. The IR packet includes a whole packet header which is not compressed. When failure in decompression is detected after the IR packet is received, the reception end may determine that the failure in decompression is caused by HFN de-synchronization.

When RoHC decompression succeeds, the reception end resets a parameter regarding the number of times of failures in decompression in step 607. That is, when RoHC decompression succeeds, the parameter determination unit 231 resets the parameter regarding the number of times of failures in decompression to 0. According to an embodiment, since success in RoHC decompression means that both deciphering and decompression succeed at the reception end, it may be determined that there is no continuous packet loss due to a wireless environment problem, which is considered in the disclosure. Accordingly, in this case, the parameter determination unit 231 may set a trycount parameter value regarding the number of times of failures in decompression to 0.

Next, in step 609, the reception end normally processes the packet which is decompressed by RoHC, and transmits the packet to a corresponding module.

When RoHC decompression fails, the reception end determines whether the parameter value regarding the number of times of failures in decompression is greater than a reference value in step 611, and increases the parameter value regarding the number of times of failures by 1. That is, when RoHC decompression fails, the parameter determination unit 231 determines whether the parameter trycount value regarding the number of times of failures of decompression accumulated up to now is greater than a pre-defined reference value N, and may increase the trycount value by 1. The pre-defined reference value N is a certain value greater than or equal to 1, and may be experimentally determined by considering an in-flight packet which is received until the reception end receives the IR packet after transmitting STATIC-NACK. According to another embodiment, the parameter trycount value regarding the number of times of failures may be increased by 1 before being compared with N.

When the parameter value regarding the number of times of failures in decompression is greater than the reference value, the reception end increases the enciphering parameter value and resets the parameter value regarding the number of times of failures in step 613. That is, the parameter determination unit 231 increases the enciphering parameter value and resets the parameter value regarding the number of times of failures in decompression. In the case of VoLTE according to an embodiment, the reception end determines that failure in RoHC decompression occurs more than a predetermined number of times due to HNF de-synchronization caused by a packet loss, and increases the HFN value by 1 and resets the trycount value to 0. Packets received thereafter are deciphered by using the increased HFN value.

For example, the reception end deciphers a received packet by applying the increased HFN value, and determines whether RoHC decompression succeeds. When RoHC decompression succeeds, the reception end retains the changed HFN value and determines an HFN value according to a typical HFN calculation algorithm. According to an embodiment, when RoHC decompression succeeds, the reception end may feed an ACK message back to the transmission end. According to other embodiments, when failure in RoHC decompression is detected even by using the increased HFN value, the process of adjusting the HFN value by comparing the number of times of failures in decompression and the pre-defined reference value may be repeated.

When the parameter value regarding the number of times of failures in decompression is less than or equal to the reference value, the reception end drops the corresponding packet in step 615. In other words, when the parameter value regarding the number of times of failures in decompression is less than or equal to the reference value, the reception end may discard the corresponding packet.

Methods based on the claims of the disclosure or the embodiments disclosed in specification of the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims of the disclosure or the embodiments disclosed in specification of the present disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the present disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the present disclosure is not limited to a single element or plural elements. An element which is expressed in a plural form may be configured in a singular form or an element which is expressed in a singular form may be configured in plural number.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims and equivalents to the scope of the claims.

What is claimed is:

1. A method for operating a reception end in a wireless communication system, the method comprising:
   receiving a first packet from a transmission end;
   deciphering the first packet by using an enciphering parameter;
   detecting a failure in decompression of a header of the deciphered first packet;
   in response to the failure in decompression of the header of the deciphered first packet being detected, determining whether a static field value of the first packet is valid;
   in case that the static field value is valid, transmitting a NACK message; and
   receiving a second packet in which a static field and a first part of dynamic field are compressed and a second part of dynamic field is uncompressed in response to the transmitting of the NACK message.

2. An apparatus for a reception end in a wireless communication system, the apparatus comprising:
   a transceiver; and
   at least one processor coupled with the transceiver and configured to:
      receive a first packet from a transmission end,
      decipher the first packet by using an enciphering parameter,
      detect a failure in decompression of a header of the deciphered first packet,
      in response to the failure in decompression of the header of the deciphered first packet being detected, determine whether a static field value of the first packet is valid,
      in case that the static field value is valid, transmit a NACK message, and
      receive a second packet in which a static field and a first part of dynamic field are compressed and a second part of dynamic field is uncompressed in response to the transmitting of the NACK message.

3. The method of claim 1, wherein the decompression is performed by a robust header compression (RoHC) compression technique.

4. The method of claim 1, wherein the enciphering parameter comprises a hyper frame number (HFN).

5. The apparatus of claim 2, wherein the decompression is performed by a robust header compression (RoHC) compression technique.

6. The apparatus of claim 2, wherein the enciphering parameter comprises a hyper frame number (HFN).

7. The method of claim 1, further comprising:
   in case that the static field value is invalid, transmitting a STATIC-NACK message; and
   receiving a third packet in which a header is uncompressed, deciphering the third packet by using the enciphering parameter in response to transmitting the STATIC-NACK message; and
   in response to the failure in decompression of the deciphered third packet being detected, comparing a parameter value regarding a number of times of failures in decompression with a pre-set reference value; and
   when the parameter value regarding the number of times of failures is greater than the pre-set reference value, increasing an enciphering parameter value.

8. The method of claim 7, further comprising:
   when the parameter value regarding the number of times of failures is greater than the pre-set reference value, resetting the parameter value regarding the number of times of failures.

9. The method of claim 7, further comprising:
   when the parameter value regarding the number of times of failures is less than or equal to the pre-set reference value, increasing the parameter value regarding the number of times of failures; and
   dropping a received packet.

10. The method of claim 7, further comprising:
    deciphering the third packet by using the increased enciphering parameter value; and
    when decompression of the header of the deciphered third packet fails, increasing the increased enciphering parameter value again.

11. The method of claim 10, further comprising:
    when decompression of the header of the deciphered third packet succeeds, transmitting information regarding a success in decompression to the transmission end; and
    receiving a fourth packet whose header is compressed from the transmission end.

12. The method of claim 10, further comprising:
    when decompression of the header of the deciphered third packet succeeds, resetting the parameter value regarding the number of times of failures in decompression.

13. The apparatus of claim 2, wherein the at least one processor is further configured to:
    in case that the static field value is invalid, transmit a STATIC-NACK message,
    receive a third packet in which a header is uncompressed, decipher the third packet by using the enciphering parameter in response to transmitting the STATIC-NACK message,
    in response to the failure in decompression of the deciphered third packet being detected, compare a parameter value regarding a number of times of failures in decompression with a pre-set reference value; and
    when the parameter value regarding the number of times of failures is greater than the pre-set reference value, increase an enciphering parameter value.

14. The apparatus of claim 2, wherein the at least one processor is further configured to, when the parameter value regarding a number of times of failures is greater than a pre-set reference value, reset the parameter value regarding the number of times of failures.

15. The apparatus of claim 2, wherein the at least one processor is further configured to, when the parameter value regarding a number of times of failures is less than or equal to a pre-set reference value, increase the parameter value regarding the number of times of failures, and to drop a received packet.

16. The apparatus of claim 2, wherein the at least one processor is further configured to:
    decipher a third packet by using an increased enciphering parameter value, and
    when decompression of the header of the deciphered third packet fails, increase the increased enciphering parameter value again.

17. The apparatus of claim 16, wherein the transceiver is further configured to:

when decompression of the header of the deciphered third packet succeeds, transmit information regarding a success in decompression to the transmission end, and receive a fourth packet whose header is compressed from the transmission end.

18. The apparatus of claim 16, wherein the at least one processor is further configured to, when decompression of the header of the deciphered third packet succeeds, reset the parameter value regarding a number of times of failures for the decompression.

* * * * *